United States Patent [19]
Jopson

[11] Patent Number: 5,822,476
[45] Date of Patent: Oct. 13, 1998

[54] TIME DELAY DEVICE FOR OPTICAL SIGNALS

[75] Inventor: Robert Meachem Jopson, Rumson, N.J.

[73] Assignee: Lucent Technologies Inc., Murray Hill, N.J.

[21] Appl. No.: 823,630

[22] Filed: Mar. 25, 1997

[51] Int. Cl.⁶ ........................................... G02B 6/26
[52] U.S. Cl. ............................ 385/27; 359/124; 359/140
[58] Field of Search ................................ 385/1, 2, 27, 32, 385/30, 42; 359/124, 128, 133, 126, 140; 372/28, 32

[56] References Cited

U.S. PATENT DOCUMENTS

| | | | |
|---|---|---|---|
| 5,101,291 | 3/1992 | Jopson | 359/124 |
| 5,153,933 | 10/1992 | Smith et al. | 385/27 |
| 5,663,822 | 9/1997 | Fee | 359/161 |

*Primary Examiner*—Rodney B. Bovernick
*Assistant Examiner*—Hemang Sanghavi

[57] ABSTRACT

A time delay device for an optical signal wherein an optical frequency comb is generated by a comb generation device. The optical frequency comb consists of a plurality of discrete and temporally spaced optical channels or carriers. The separation of the channels is dictated by the shifting frequency applied to the comb generation device and the temporal spacing is defined by the length of fiber used so that a time delay is created for each traverse of the fiber loop by the optical frequency comb. A filter connected to the comb generation device is used for tuning to a particular frequency or channel in the optical comb to obtain an optical signal having a desired time delay.

11 Claims, 3 Drawing Sheets

TIME DELAY DEVICE FOR OPTICAL SIGNALS

BACKGROUND OF THE INVENTION

I. Field of the Invention

The present invention relates to an optical delay circuit for timing optical signals for use in a data traffic control system of an optical communication network.

II. Description of Background Art

Communication networks often require that a signal be aligned in time with one or more other signals. The required alignment may be exact such that all of the signals appear at a location at substantially the same instant in time for processing, such as for adding the signals together. The alignment may also be conducted in a staggered manner for data traffic control wherein signals are delayed by a specific amount of time, as for time division multiplexing (TDM) the signals on a single optical fiber, or for data packet management.

In regenerated lightwave networks wherein the optical signals are converted to electric signals and then re-converted back to optical signals, alignment of signals is accomplished by using electronic circuitry for delaying the electric signals before they are reconverted back to corresponding optic signals. However, in an optically transparent network in which optic signals are not converted to electric signals until, for example, the transmitted data is output from the network, electronic delay circuitry cannot be used. Accordingly, an optical time delay device is needed for delaying optical signals to facilitate alignment in optically transparent networks.

SUMMARY OF THE INVENTION

The present invention provides a time delay apparatus for delaying an optical signal in an optical communications network. The invention utilizes an optical circuit containing an optical frequency translating device or comb generator which generates an optical frequency comb having a plurality of temporally and frequency spaced channels that are replicas of an optical input signal. The frequency spacing between adjacent channels or "teeth" in the optical frequency comb is dictated by the frequency of the shifting signal (e.g. acoustic, electric, electrooptic, magnetooptic, etc.) that is applied to the comb generation device, and the temporal spacing is dictated by the optical path length used in the comb generation device. The term "optical path length" is the distance light must travel in a vacuum to cause the same delay as that experienced in the optical circuit.

Each tooth in the optical comb is a replica of the input signal except that it is frequency shifted (up or down) from the input signal by a frequency proportional to an integer multiple of the frequency of the shifting signal. Also, the time delay of each tooth is equal to the number of times that the signal in the tooth has traversed the fiber loop in the comb generation device. By placing a filter at the output of the comb generation device to select a particular tooth in the frequency comb, a desired optical channel having a corresponding desired time delay can be obtained.

The resulting optical channel will have a frequency equal to the frequency of the input signal offset or shifted by an integer number multiple of the frequency applied to the frequency translating device (the shifting signal frequency). In addition, the channel will be time delayed by an amount proportional to the number of times that the optical comb traverses the optical loop circuit.

In another embodiment, a tunable filter is disposed between a first and a second comb generator and a second filter is disposed at the output of the second comb generator. Such a configuration can be used for improving the time delay resolution of the optical frequency comb output by the second translation device and can also be used for selecting an output optical signal having the same frequency as an input signal but time delayed by a desired amount. The second filter may be used for filtering out or selecting an optical channel having the same frequency as the input optical signal but at a desired time delay which is dictated by the time lapse for the first and second comb generation devices as well as the frequency set by the first tunable filter. The selected signals form an output optical frequency comb containing a channel having the same frequency as the input optical signal.

In yet another embodiment, a frequency translation device for producing a frequency shifted replica of an optical input signal having a desired delay is disclosed. The frequency translation device includes a first comb generator for generating from the optical input signal a first optical frequency comb containing a plurality of discretely separated optical channels with each channel replicating the optical input signal but being spaced apart from each other by a first fixed frequency separation. A first tunable filter having a selected filter frequency and connected to the first comb generator is included for receiving the first optical frequency comb as an input signal to the filter and for selecting from the first frequency comb and outputting from the filter a selected one of the optical channels frequency shifted by a first integer multiple of the first fixed frequency separation of the input signal by selecting the filter frequency to pass the desired optical channel. The desired optical channel from the first optical frequency comb is provided as an input signal to a second comb generation device for generating a second optical frequency comb containing a plurality of discretely separated optical channels, with each of the channels in the second optical frequency comb a replicating the desired optical input signal but being spaced apart by a second fixed frequency separation. A second tunable filter having a selected filter frequency and connected to the second comb generator is provided for receiving the second optical frequency comb as an input signal to the second filter and for selecting from the second frequency comb and outputting from the second filter a selected one of the optical channels of the second frequency comb frequency shifted by a second integer multiple of the second fixed frequency separation of the desired optical channel by selecting the second filter frequency to pass the desired optical channel of the second frequency comb.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views.

DETAILED DESCRIPTION OF THE PRESENTLY PREFERRED EMBODIMENTS

The inventive time delay device for delaying an optical signal to facilitate alignment or synchronism of the delayed signal with other optical signals utilizes the frequency translation circuits which are fully described in commonly owned and copending U.S. patent application Ser. No. 08/742,712, filed Nov. 1, 1996 and titled "Optical Frequency Conversion Device", the entire contents of which is incorporated by reference herein. As therein explained, an optical frequency comb can be generated by a variety of techniques such, for example, as by acoustooptic scattering, magnetooptic scattering, and single sideband modulation.

Acoustooptic scattering can be performed by introducing an optical signal through a waveguide having an acoustic wave propagating therethrough, or by sending an optical signal through a Bragg cell along with an acoustic signal, as for example described in commonly owned U.S. Pat. No. 5,101,291. The frequency of the optical signal is shifted by the frequency of the acoustic signal provided to the Bragg cell.

For magnetooptic scattering, an optical signal is provided to a cell having magnetic properties and a magnetic wave propagating therethrough; the frequency of the optical signal in this case is shifted by an amount equal to the frequency of the magnetic wave. Finally, if single sideband modulation is used wherein an optical signal is mixed with an RF signal, then the frequency of the generated sideband will be some integer multiple of the RF signal frequency, i.e. the optical signal frequency will be shifted by an integer multiple of the RF signal. Irrespective of which technique is used, the present invention is operable to generate and select an optical carrier or channel from an optical frequency comb, the channel being a time delayed replica of an input optical signal. The selected delayed replica can then be used, by way of example, for time division multiplexing of multiple optical signals on an optical fiber, etc.

Figure 1:
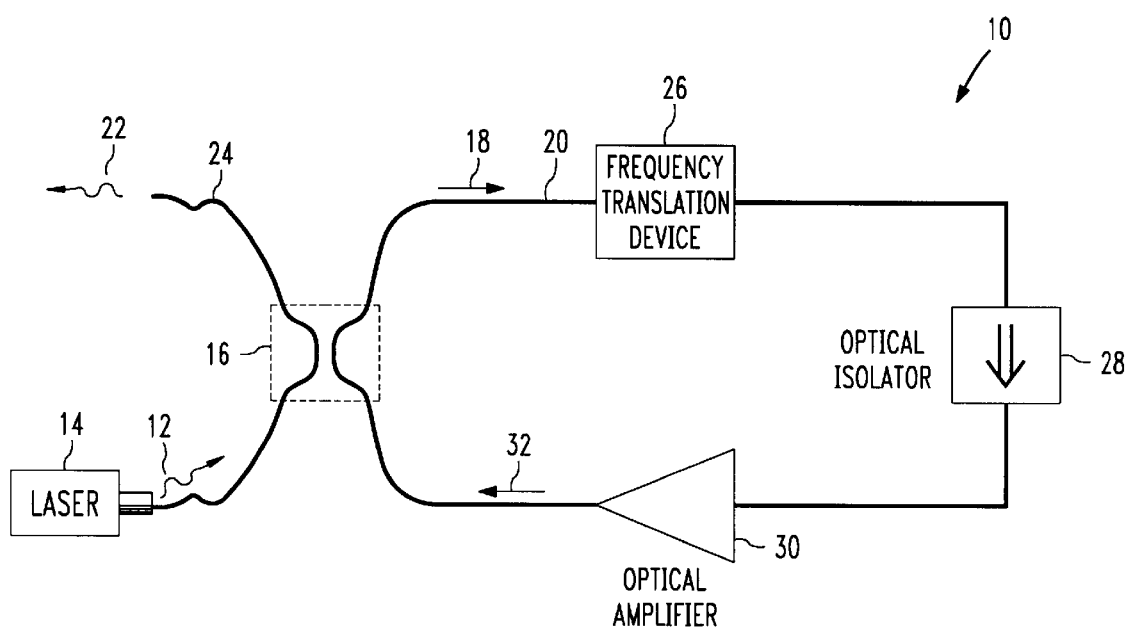
FIG. 1 is a schematic block diagram of an optical comb generation device for use in accordance with the present invention.

Turning now to the drawings, and initially to FIG. 1, a comb generator optical circuit 10 is there depicted. As shown, an optical signal 12 having a particular frequency may be generated from a signal input such, for example, as a laser 14 and provided to an input port of a directional coupler 16 for combining with an optical frequency comb 32 to form frequency comb 18 contained on an optical fiber 20. The directional coupler 16 also provides an output optical comb signal 22—which may be equal to optical frequency comb 18 depending on the coupling ratio of directional coupler 16—to an output port 24. Like optical frequency comb 32, output optical comb 22 is comprised of a plurality of frequency spaced discrete optical carriers.

Frequency comb 18 is carried, via fiber 20, to a frequency shift or translation device 26 which provides a shift to the frequencies of the comb each time that the comb is input thereto. For example, suppose at time t=0 that the only optical signal in the circuit 10 is signal 12. This signal is frequency shifted by device 26, and amplified by an optical amplifier 30. The resulting signal 32, which is now a frequency shifted replica of signal 12, is provided to output port 24 and is also coupled with incoming optical signal 12 so that, during the next pass through the circuit 10, both signals (12 and 32) and, hence, both frequencies, are shifted. Thus, after a lapse of time the optical frequency comb 18 is formed having a plurality of optical carriers or channels, e.g. spaced frequencies, which are temporally separated from each other. The number of discrete frequencies or channels in the comb may be limited by the frequency response of the circuit 10, such as by the optical amplifier 28 or a filter (not shown).

The temporal spacing between adjacent channels in the optical comb results from the length of time it takes for the optical signal to traverse the loop in circuit 10, which is in turn influenced by the length of the fiber 20 and other components through which the optical signal travels. For example, it takes an optical signal approximately 1 ns to traverse a 20 cm length of fiber. Thus, each frequency or channel in the optical frequency comb has a single corresponding delay time. In other words, for each additional 20 cm fiber length, a second channel in the comb will be present at an output at a time that is delayed an additional 1 ns relative to the presence of the first channel, and the third channel will be delayed an additional 2 ns relative to the first channel, etc.

With continued reference to FIG. 1, the frequency translation circuit 10 also includes an optical isolator 28 which directs the flow of the optical signal carried by the circuit 10 in a particular direction, e.g. the clockwise direction as shown in the figure. The optical amplifier 30 is included for amplifying the optical signal carried by the circuit 10 to account for signal loss that occurs. As discussed in U.S. Pat. No. 5,101,291, a suitable optical amplifier is a semiconductor optical amplifier or an Erbium-doped optical amplifier, both of which are well known to those having ordinary skill in the art.

Figure 2:
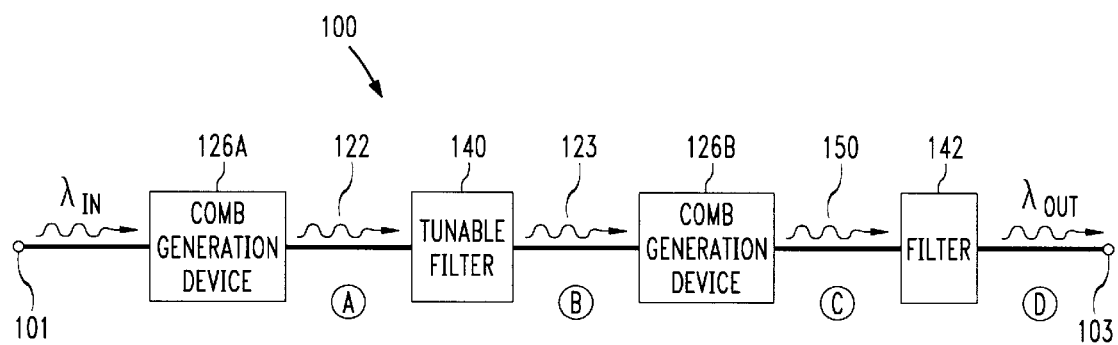
FIG. 2 is a block diagram of a time delay device for an optical signal in accordance with the present invention.

Referring now to FIG. 2, a time delay device 100 incorporating the frequency translation circuit 10 (shown as 126A and 126B) is there depicted. As shown, the device includes an input terminal 101 which receives an input optical signal $\lambda_{in}$ in having an input frequency $\nu_{in}$, and an output terminal 103 for an output optical signal $\lambda_{out}$ having an output frequency $\nu_{out}$. Signal $\lambda_{in}$ is provided to a first comb generation device 126A, which is an optical loop circuit of the type described in FIG. 1 having a particular optical fiber length, for generating an output optical comb 122 having temporally spaced optical frequency channels or carriers with each channel having a corresponding delay time relative to the other channels in the comb. The temporal spacing is dictated by the optical path length present in the comb generation device 126A. The frequency spacing between adjacent channels, on the other hand, is dictated by the particular technique used by the comb generation device 126 for generating the frequency comb and, in particular, by the frequency of the shifting signal (acoustic, electric or RF) used by the comb generation device. In general, for an input signal $\lambda_{in}$ represented by $$E_{in}(t)e^{i\nu_{in}t}$$

wherein $E_{in}$ is the amplitude of the input signal, the output optical comb generated by the comb generation device 126 is represented by $$\sum_{m=0}^{M} A_m E_{in}(t - m\tau) e^{i(\nu_{in} + m\delta f)t}$$

wherein M is the maximum number of round trips through the fiber loop (which is determined by a filter or other bandwidth limit in the optical circuit); δf is the (positive or negative) frequency shift in a single pass of the optical loop circuit; $\nu_{in}$ is the frequency of the input optical signal $\lambda_{in}$, $A_m$ is the net gain for the $m^{th}$ tooth on the frequency comb, and τ is the loop delay time (e.g. the time that it takes for the optical signal to traverse the optical loop).

The frequency of each channel in the output optical comb 122 is determined by the formula $\nu_m = \nu_{in} + m\delta f$, wherein $\nu_{in}$ is the frequency of the input signal and m is the number of times that the signal traverses the optical loop. For example, if τ is the loop delay time corresponding to the optical path length and δf is the single-pass frequency shift, then a replica of the input signal delayed by mτ is available at the signal frequency shifted by mδf. The copy of the signal will have made m (an integer) passes around the optical comb generator loop.

By placing a filter 140 at the output of comb generation device 126A so that the filter receives the frequency comb 122 as an input, a selected channel or frequency in the optical comb 122 can be chosen based on a desired delay time. For example, if a comb generator has a 30 cm optical path length, and if a 3 ns relative delay (corresponding to three traverses through the optical loop) is desired, then the filter can be tuned to pass a frequency of $\nu_{in} + 3\delta f$ which corresponds to an optical channel having a 3 ns delay.

Figure 3:
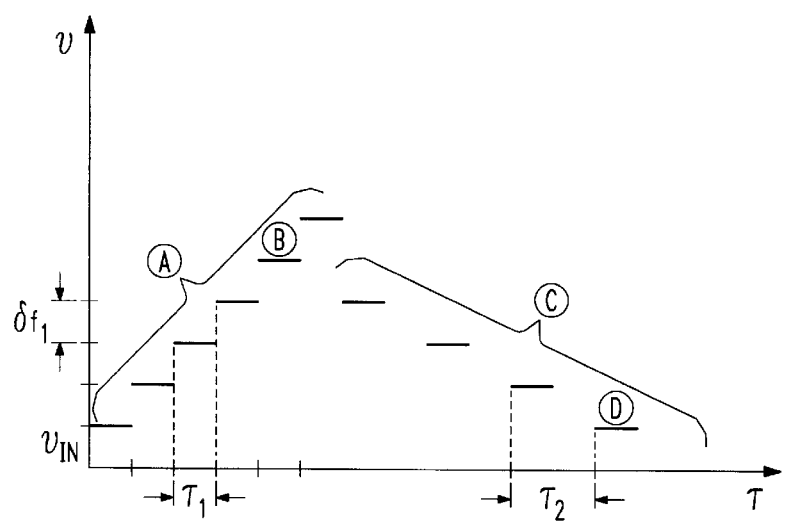
FIG. 3 is a frequency versus time plot of the optical channels produced at various stages of the block diagram of FIG. 2.

FIG. 3 depicts a graphic representation of the frequency versus time components of the channels at various points in the apparatus shown in FIG. 2. The region designated by "A" represents the time and frequency behavior of a pulse which is input at port 101 of FIG. 2 as observed at position "A" of FIG. 2 (i.e. at the output of comb generation device 126A) and the designation "B" in FIG. 3 represents the selection of a particular optical channel and corresponds to position "B" in FIG. 2 (at the output of the tunable filter 140). As seen in FIG. 3, comb generation device 126A produces an output optical frequency comb 122 having channels temporally spaced by a time $\tau_1$ (representing the time delay caused by the optical signal traversing the optical loop in comb generation device 126A), and the frequency spacing between adjacent channels is designated as $f_1$. For clarity, the response to a pulse of width $\tau_1$ shown here, and hence only one "tooth" of the frequency comb 122 is present at any given time.

For certain applications, it may be desirable to obtain a replica of an input optical signal but delay the replica by a particular amount so that, for example, the delayed replica is available at a precise time for mixing or multiplexing with another signal. Thus, and with continued reference to FIG. 3, if a 5 ns delay is required then the filter 140 will be adjusted for retrieving channel "B", corresponding to five passes through the optical loop in comb generation device 126A (assuming the aforementioned 1 ns delay time for the comb generator 126A). By knowing the frequency shift $f_1$ applied to the comb generation device 126A, the filter 140 can be appropriately adjusted to obtain the desired 5 ns delayed signal.

The heretofore described apparatus provides the ability to select a particular replica of an input signal based on a desired delay tine, since each channel has a corresponding delay time. In such an implementation, however, the resolution in the delay adjustment is equal to the loop delay time of the optical comb generator or frequency translation device 226A, e.g. the optical path length and, for certain applications, a higher resolution may be desired. Moreover, for example, if channel "B" is desired with a time delay of 5.5 ns instead of a time delay of 5 ns, the desired time delay is unavailable from the frequency comb 122.

Time delay resolution finer than the delay time in optical comb 122 generated by frequency translating device 126A can nevertheless be obtained in accordance with the present invention by using two comb generation devices having different loop delay times. Such a system will now be described with continued reference to FIG. 2. As there shown, a finer time delay is achieved by employing a second comb generation device 126B which receives, as an input signal, optical signal 123 corresponding to channel "B" which was retrieved from optical comb 122 by the tunable filter 140. Device 126B generates and outputs a second optical frequency comb 150. The comb generation device 126B can have a different optical path length than the length used in comb generation device 126A. For example, comb generation device 126A can be designed for generating from the input signal channel a comb of signals with a time delay $\tau_1$ and a frequency spacing of $\delta f_1$ and comb generation device 126B can be designed for generating from input channel B a comb of signals with a time delay of $\tau_2$ and a frequency spacing of $\delta f_2$. If filter 140 is used to select the $m^{th}$ channel of the comb output from comb generation device 126A and filter 142 is used to select the $(n-m)^{th}$ channel of the resultant comb output from comb generation device 126B, then the selected channel at C will have a frequency of $\nu_{in} + m\delta f_1 + (n-m)\delta f_2$ and a delay of $m\tau_1 + (n-m)\tau_2$. The delay can be rewritten as $n\tau_2 + m(\tau_1 - \tau_2)$. It can be seen that by adjusting filters 140 and 142 in tandem so that m+n remains constant, a delay resolution of $(\tau_1 - \tau_2)$ can be obtained. The filter tuning can be simplified by setting the frequency shifts to be equal in sign and magnitude: $\delta f = \delta f_1 = \delta f_2$.

In this case, a filter 142 placed at the output of the second frequency translating device 126B selects a desired channel having a frequency of $\nu_{in} + n\delta f$. Thus, the input optical signal $\lambda_{in}$ makes or traverses a total of n loops in the optical comb generators or frequency translation devices, of which m loops are in the first optical comb generator and n-m loops are in the second optical comb generator; the total delay is $m\tau_1 + (n-m)\tau_2 = n\tau_2 + m(\tau_1 - \tau_2)$. Thus, the tunable filter 140 may be used to vary the time delay in steps of $\tau_1 - \tau_2$ which can be made as small as desired by adjusting the fiber lengths in the comb generation devices 126A and 126B.

It will be appreciated that by properly designing comb generation device 126B, an optical comb having frequencies less than the input signal (channel "B") can be generated. By using a frequency translator 126B having a frequency equal in magnitude but of opposite sign to that of frequency translator 126A so that the frequency spacing $\delta f_2$ in optical frequency comb 150 is equal to the frequency spacing $\delta f_1$ of optical frequency comb 122, optical frequency comb 150 will contain an optical channel having the same frequency $\nu_{in}$ as the input signal $\lambda_{in}$ but present at a time delay of some multiple of $\tau_1 + \tau_2$ which is determined by the filter 140.

Figure 4:
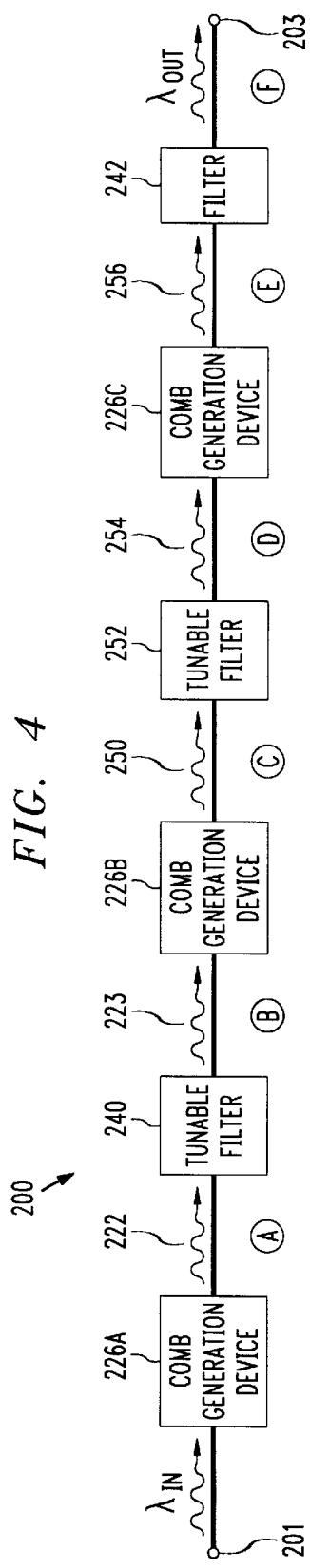
FIG. 4 is a block diagram of an alternative embodiment of the present invention.

FIG. 4 depicts a modification of the embodiment of FIG. 2. As shown in FIG. 4, the modified time delay device 200 consists of three comb generation devices 226A, 226B and 226C and two preferably tunable filters—a filter 240 disposed between comb generation devices 226A and 226B, and a filter 252 disposed between comb generation devices 226B and 226C. The comb generation devices can be used to increase or decrease the frequency of the optical channels.

As in the embodiment of FIG. 2, first comb generation device 226A outputs a first optical frequency comb 222 at position "A" and a desired channel is selected and passed by tunable filter 240. The selected channel is shown as signal 223 and corresponds to channel "B". Signal 223 serves as an input to the second comb generation device 226B which generates a second optical frequency comb 250 at position "C", and this second frequency comb is input to the second tunable filter 252 which selects a desired channel 254 therefrom, e.g. channel "D". Signal 254 is then input to the third comb generation device 226C which generates a third optical frequency comb 256 at position "E" from which a desired channel is removed by filter 242 for outputting an optical output signal $\lambda_{out}$ through an output port 203 of the device 200 at position "F". Filter 242 can be a tunable filter or a fixed frequency filter.

Figure 5:
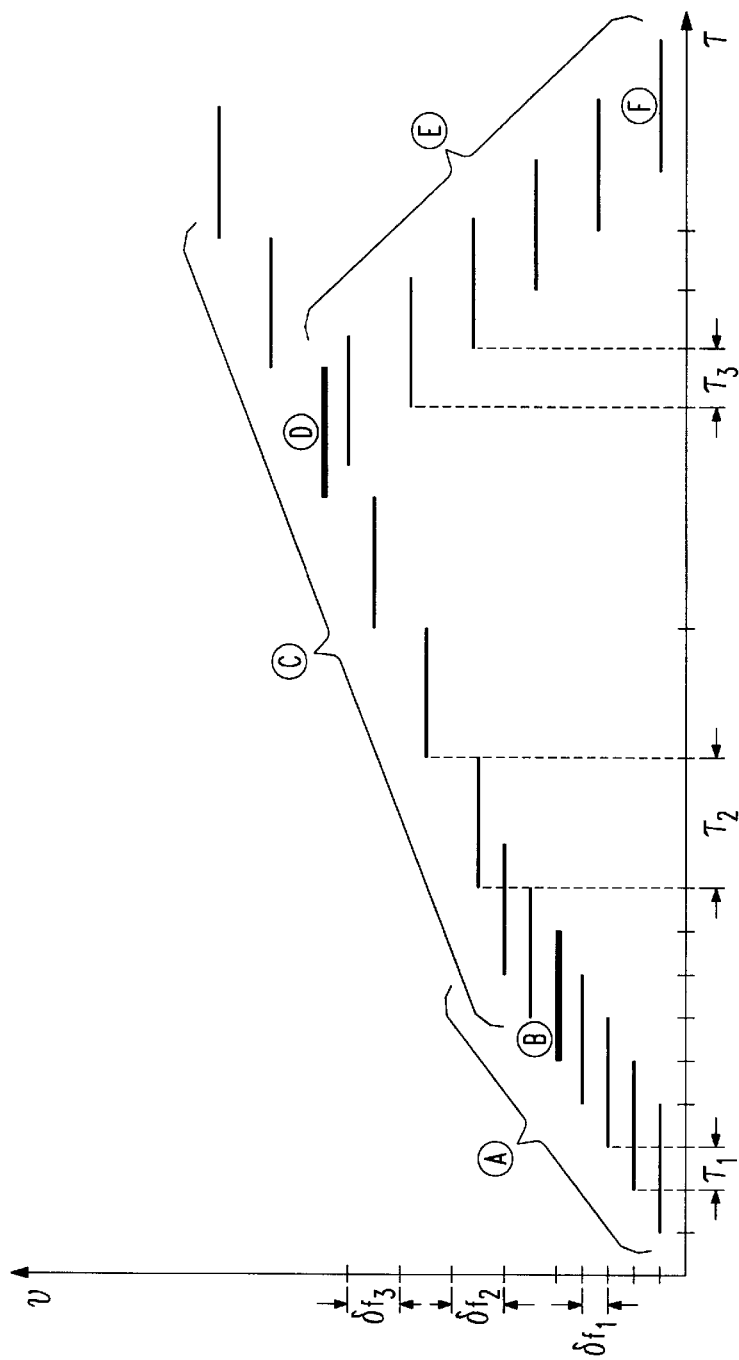
FIG. 5 is a frequency versus time plot of the optical channels produced at various stages of the block diagram of FIG. 4.

The channels of the frequency combs generated by the time delay device 200 are depicted in FIG. 5 for an input pulse of length equal to $\tau_2$, the delay of the second comb generator device 226B. As there shown, position "A" corresponds to the optical frequency comb 222 generated by comb generation device 226A and having a temporal spacing of $\tau_1$ and a frequency spacing of $\delta f_1$. Channel "B" serves as the input signal to the comb generation device 226B for generating the optical frequency comb 250 which is shown as "C" having a temporal spacing of $\tau_2$ and a frequency spacing of $\delta f_2$. Optical frequency comb 250 continues the frequency shift provided in optical frequency comb 222, that is, the shifting frequency used by second frequency translating device 226B is of the same sign as the shifting frequency of first comb generation device 226A. The output from tunable filter 252 selects channel "D" which is then input to the third comb generation device 226C that uses a shifting frequency opposite in sign to the shifting frequencies of the first and second comb generation devices so that the optical frequency comb 256 extends in a direction opposite to that of optical frequency combs 222 and 250. Frequency comb "E" (signal 256 in FIG. 4) is shown having a temporal spacing of $\tau_3$ and a frequency spacings of $\Delta f_3$. In one particular embodiment of the invention, frequency comb 256 shifts the frequency of the previous signal (channel "D") back to the input frequency of $\lambda_{in}$ (shown as "F") at a particular time delay. If the magnitudes of the frequency shifts are the same, i.e. $\delta f_1 = \delta f_2 = -\delta f_3$, then the total delay time is represented by $T = n(\tau_2 + \tau_3) + m(\tau_1 - \tau_2)$ when tunable filter 240 is set to pass the $n^{th}$ channel of frequency comb 222, tunable filter 252 is set to pass the $(n-m)^{th}$ channel for frequency comb 250 and tunable filter 242 is set to pass the $n^{th}$ channel of frequency comb 256. It will be readily appreciated by those skilled in the art that the concept described herein can be extended to provide three or more independently controllable resolutions.

It will also be readily appreciated and understood by those skilled in the art that the time delay device described hereinabove can be utilized for frequency translation applications. For example, by utilizing the optical comb generating devices and tunable filters an output signal having a desired frequency can be selected by filtering out the desired frequency channel from the resulting generated frequency comb. In other words, as the frequency separation between adjacent optical channels in a first optical comb can be different than the frequency separation between adjacent optical channels in a second optical frequency comb, a desired frequency can be selected by tuning a desired filter.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:
1. A time delay device for producing a predeterminately time delayed replica of an optical input signal, comprising:
   a comb generation device for generating from the optical input signal an optical frequency comb comprising a plurality of temporally spaced and discretely separated optical channels, said channels each comprising a replica of the optical input signal and being spaced apart by a first fixed frequency separation and a temporal spacing delay time, said comb generating device comprising a fiber having a length and wherein the temporal spacing between the discretely separated optical channels is produced by the input optical signal traversing said fiber; and
   a filter having a selected filter frequency and connected to said comb generation device for receiving the optical frequency comb generated by said comb generation device as an input signal to the filter and for selecting from the frequency comb and outputting from the filter a selected one of the optical channels temporally delayed by an integer multiple of the temporal spacing delay time by selecting the filter frequency to pass the selected optical channel delayed from the optical input signal by said integer multiple of the temporal spacing delay time.

2. The time delay device of claim 1, wherein said filter is selectively tunable for passing substantially any select one of the discretely separated channels of the optical frequency comb.

3. The time delay device of claim 1, further comprising a second comb generation device connected to said filter and for receiving, as an input to said second frequency translating device, the selected channel output from said filter and for generating from the input selected channel a second optical frequency comb comprising a plurality of temporally spaced and discretely separated second optical channels, said second channels in the second optical frequency comb each comprising a replica of the selected channel output from said filter and being spaced apart by a second fixed frequency separation and a second temporal spacing delay time; and
   a second filter having a selected second filter frequency and connected to said second comb generation device for receiving the second optical frequency comb generated by said comb generation device as an input signal to the second filter and for selecting from the second optical frequency comb and outputting from the second filter a selected one of the second optical channels temporally delayed by a second integer multiple of the second temporal spacing delay time by selecting the second filter frequency of the second filter.

4. The time delay device of claim 3, wherein said second comb generation device comprises a fiber loop having a length and wherein the second temporal spacing between the discretely separated second optical channels in the second optical frequency comb is produced by the selected second channel traversing said fiber loop in said second comb generation device.

5. The time delay device of claim 3, wherein said second filter is tunable for passing substantially any select one of the discretely separated second channels of the second optical frequency comb.

6. The time delay device of claim 3, further comprising a third comb generation device connected to said second filter and for receiving, as an input signal to said third comb generation device, said selected second channel output from said second filter and for generating from the input selected second channel a third optical frequency comb comprising a plurality of temporally spaced and discretely separated third optical channels, said third channels in the third optical frequency comb each comprising a replica of said second selected channel from the second optical frequency comb and being spaced apart by a third fixed frequency separation and a third temporal spacing delay time; and a third filter having a selected third filter frequency and connected to said third comb generation device for receiving the third optical frequency comb generated by said third comb generation device as an input signal to the third filter and for selecting from the third optical frequency comb and outputting from the third filter a selected one of the third optical channels temporally delayed by a third integer multiple of the third temporal spacing delay time by selecting the third filter frequency of the third filter.

7. The time delay device of claim 6, wherein said third comb generation device comprises a fiber loop having a length and wherein the third temporal spacing between the discretely separated third optical channels in the third optical frequency comb is produced by the selected third channel traversing said fiber loop in said third comb generation device.

8. The time delay device of claim 6, wherein said third filter is tunable for passing substantially any select one of the discretely separated third channels of the third optical frequency comb.

9. The time delay device of claim 7, wherein said first comb generation device comprises a first fiber loop having a first length and wherein the first temporal spacing between the discretely separated first optical channels in the first optical frequency comb is produced by the selected first channel traversing said first fiber loop in said first comb generation device, and wherein said second comb generation device comprises a second fiber loop having a second length and wherein the second temporal spacing between the discretely separated second optical channels in the second optical frequency comb is produced by the selected second channel traversing said second fiber loop in said second comb generation device.

10. The time delay device of claim 8, wherein said first and said second filter is tunable for passing substantially any select one of the discretely separated first and second channels of the first and second optical frequency combs, respectively.

11. A frequency translation device for producing a predeterminately frequency shifted replica of an optical input signal, comprising:

a first comb generation device for generating from the optical input signal a first optical frequency comb comprising a plurality of discretely separated optical channels, said channels each comprising a replica of the optical input signal and being spaced apart by a first fixed frequency separation;

a tunable filter having a selected filter frequency and connected to said first comb generation device for receiving the first optical frequency comb as an input signal to the filter and for selecting from the first frequency comb and outputting from the filter a selected one of the optical channels frequency shifted by a first integer multiple of the first fixed frequency separation of the input signal by selecting the filter frequency to pass the desired optical channel;

a second comb generation device for generating from the desired optical channel a second optical frequency comb comprising a plurality of discretely separated optical channels, each of said channels in said second optical frequency comb comprising a replica of the desired optical input signal and being spaced apart by a second fixed frequency separation; and a second tunable filter having a selected filter frequency and connected to said second comb generation device for receiving the second optical frequency comb as an input signal to the second filter and for selecting from the second frequency comb and outputting from the second filter a selected one of the optical channels of the second frequency comb frequency shifted by a second integer multiple of the second fixed frequency separation of the desired optical channel by selecting the second filter frequency to pass the desired optical channel of the second frequency comb.

\* \* \* \* \*